(12) United States Patent
Zhu

(10) Patent No.: US 12,005,684 B2
(45) Date of Patent: Jun. 11, 2024

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Cuilin Zhu, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 645 days.

(21) Appl. No.: 17/275,288

(22) PCT Filed: Dec. 31, 2020

(86) PCT No.: PCT/CN2020/141974
§ 371 (c)(1),
(2) Date: Mar. 11, 2021

(87) PCT Pub. No.: WO2022/141352
PCT Pub. Date: Jul. 7, 2022

(65) Prior Publication Data
US 2022/0208028 A1    Jun. 30, 2022

(30) Foreign Application Priority Data

Dec. 29, 2020 (CN) .......................... 202011586530.0

(51) Int. Cl.
*B32B 3/02* (2006.01)
*B32B 7/02* (2019.01)
*B32B 7/12* (2006.01)

(52) U.S. Cl.
CPC .................. *B32B 3/02* (2013.01); *B32B 7/02* (2013.01); *B32B 7/12* (2013.01); *B32B 2307/7375* (2023.05); *B32B 2457/20* (2013.01)

(58) Field of Classification Search
CPC .... B32B 3/02; B32B 7/02; B32B 7/12; B32B 2307/7375; B32B 2457/20
(Continued)

(56) References Cited

U.S. PATENT DOCUMENTS

2016/0179229 A1* 6/2016 Ahn ....................... G06F 3/0443
345/173
2019/0172376 A1* 6/2019 Wang ..................... H10K 71/00
(Continued)

FOREIGN PATENT DOCUMENTS

CN     104347678 A     2/2015
CN     108735103 A     11/2018
(Continued)

*Primary Examiner* — Betelhem Shewareged
(74) *Attorney, Agent, or Firm* — The Roy Gross Law Firm, LLC; Roy Gross

(57) ABSTRACT

A display panel and a display device are disclosed and include a first non-bending region and a second non-bending region disposed opposite to each other, a support structure disposed between the first non-bending region and the second non-bending region, and a bending region connected to the first non-bending region and the second non-bending region. A step structure is formed on a side of the support structure near the bending region such that when the bending region is squeezed by an external force, the step structure on the support structure can disperse stress, and the bending region would not deform extremely easily, which prevents broken wires and improve a production rate.

18 Claims, 3 Drawing Sheets

(58) Field of Classification Search
USPC .................................................... 428/195.1
See application file for complete search history.

(56) References Cited

U.S. PATENT DOCUMENTS

2020/0225699 A1    7/2020  Yu et al.
2022/0208028 A1*   6/2022  Zhu ......................... B32B 3/02

FOREIGN PATENT DOCUMENTS

| | | |
|---|---|---|
| CN | 108877519 A | 11/2018 |
| CN | 109065589 A | 12/2018 |
| CN | 109859642 A | 6/2019 |
| CN | 110379308 A | 10/2019 |
| CN | 110610665 A | 12/2019 |
| CN | 110634398 A | 12/2019 |
| CN | 111029393 A | 4/2020 |
| CN | 111106150 A | 5/2020 |
| CN | 111477670 A | 7/2020 |
| CN | 111816082 A | 10/2020 |
| CN | 111968521 A | 11/2020 |
| CN | 112071193 A | 12/2020 |
| CN | 112116879 A | 12/2020 |
| WO | 2020065910 A1 | 4/2020 |

* cited by examiner

DISPLAY PANEL AND DISPLAY DEVICE

FIELD OF INVENTION

The present invention relates to a field of display technologies, especially relates to a display panel and a display device.

BACKGROUND OF INVENTION

In the modern telecommunication industries, the market demand for mobile phones, TVs, tablets, notebooks, digital cameras and other products is increasing, and various display devices are also developing toward larger sizes and flexibility. However, larger products have a larger bending region and a softer body. In the conventional technology, a display panel non-bending region only relies on a support structure supporting a non-bending region to maintain a shape of the bending region. When squeezed by an external force, a region of the bending region near the support structure is easily recessed to cause broken wires in the bending region due to stress concentration such that the product easily have unwanted bright line, which lowers the production rate.

SUMMARY OF INVENTION

Technical Issue

An embodiment of the present invention provides a display panel and a display device to solve the issue of easily broken wires and low production rate of a conventional display panel.

Technical Solution

In a first aspect, the embodiment of the present invention provides a display panel, the display panel comprises:
  a bending region;
  a first non-bending region;
  a second non-bending region, the second non-bending region disposed opposite to the first non-bending region, and the second non-bending region connected to the first non-bending region through the bending region; and
  a first support structure, the first support structure disposed between the first non-bending region and the second non-bending region, a step structure formed on a side of the first support structure near the bending region, and the step structure configured to support the bending region.

Furthermore, a step range of the step structure along an extension direction of the first non-bending region is 0.1 mm-0.3 mm.

Furthermore, the first support structure comprises:
  a first support layer, the first support layer directly connected to the first non-bending region, and the first support layer supporting the first non-bending region;
  a second support layer, the second support layer disposed under the first support layer; and
  a third support layer, the third support layer disposed under the second support layer and located above the second non-bending region, and the third support layer supporting the second non-bending region.

Furthermore, a side of the second support layer near the bending region exceeds the first support layer; a side of the third support layer near the bending region exceeds the second support layer.

Furthermore, a length of the second support layer exceeding the first support layer is equal to a length of the third support layer exceeding the second support layer.

Furthermore, the second support layer is a multi-layer structure that is laminated, and a step structure is formed on a side of the multi-layer structure forming the second support layer near the bending region.

Furthermore, material of each layer of the multi-layer structure is different.

Furthermore, material of the first support layer and material of the third support layer are the same.

Furthermore, a photosensitive adhesive after curing is connected to the first non-bending region and the second non-bending region, and the photosensitive adhesive after curing is bent to form the bending region.

In a second aspect, the embodiment of the present invention further provides a display device, the display device comprises the display panel as above, and the display panel comprises:
  a bending region;
  a first non-bending region;
  a second non-bending region, the second non-bending region disposed opposite to the first non-bending region, and the second non-bending region connected to the first non-bending region through the bending region; and
  a first support structure, the first support structure disposed between the first non-bending region and the second non-bending region, a step structure formed on a side of the first support structure near the bending region, and the step structure configured to support the bending region.

Furthermore, a step range of the step structure along an extension direction of the first non-bending region is 0.1 mm-0.3 mm.

Furthermore, the first support structure comprises:
  a first support layer, the first support layer directly connected to the first non-bending region, and the first support layer supporting the first non-bending region;
  a second support layer, the second support layer disposed under the first support layer; and
  a third support layer, the third support layer disposed under the second support layer and located above the second non-bending region, and the third support layer supporting the second non-bending region.

Furthermore, a side of the second support layer near the bending region exceeds the first support layer; a side of the third support layer near the bending region exceeds the second support layer.

Furthermore, a length of the second support layer exceeding the first support layer is equal to a length of the third support layer exceeding the second support layer.

Furthermore, the second support layer is a multi-layer structure that is laminated, and a step structure is formed on a side of the multi-layer structure forming the second support layer near the bending region.

Furthermore, material of each layer of the multi-layer structure is different.

Furthermore, material of the first support layer and material of the third support layer are the same.

Furthermore, a photosensitive adhesive after curing is connected to the first non-bending region and the second non-bending region, and the photosensitive adhesive after curing is bent to form the bending region.

Advantages

The display panel provided by the embodiment of the present invention, comprises a first non-bending region and a second non-bending region disposed opposite to each other, a support structure disposed between the first non-bending region and the second non-bending region, and a bending region connected to the first non-bending region and the second non-bending region. A step structure is formed on a side of the support structure near the bending region such that when the bending region is squeezed by an external force, the step structure on the support structure can disperse stress, and the bending region would not deform extremely easily, which prevents broken wires and improve a production rate.

DESCRIPTION OF DRAWINGS

Specific embodiments of the present invention are described in details with accompanying drawings as follows to make technical solutions and advantages of the present invention clear.

DETAILED DESCRIPTION OF PREFERRED EMBODIMENTS

Figure 1:
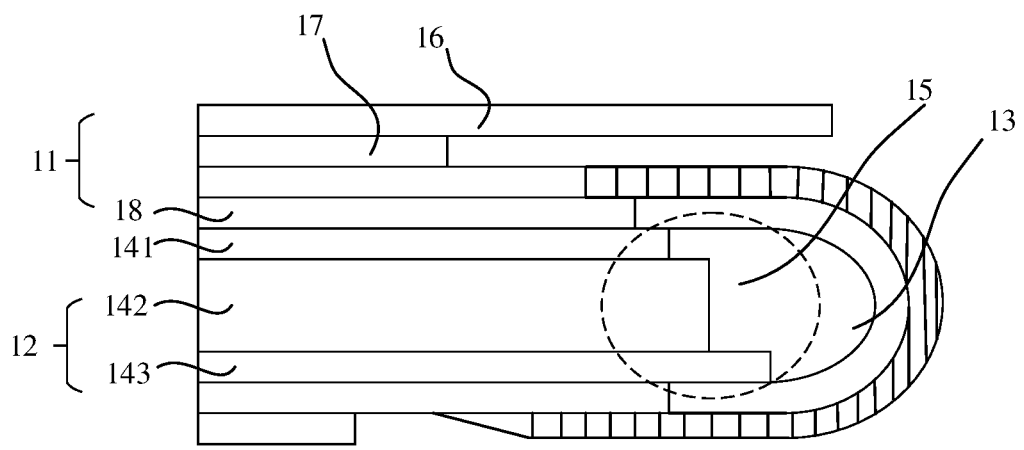
FIG. 1 is a schematic structural view of an embodiment of a display panel provided by the present invention.

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

In the description of the present invention, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present invention and simplifying the description instead of indicating or implying that the referred device or element must have a specific orientation or position, must to be structured and operated with the specific orientation or position. Therefore, they should not be understood as limitations to the present invention. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present invention, a meaning of "a plurality of" is two or more, unless there is a clear and specific limitation otherwise.

In the description of the present invention, it should be noted that unless clear rules and limitations otherwise exist, terminologies "install", "connect", "connection" should be understood in a broad sense. For instance, the connection can be a fixed connection, a detachable connection or an integral connection. The connection can be a mechanical connection, an electrical connection or a telecommunication. The connection can be a direct connection, an indirect connection through an intermedium, can be an internal communication between two elements or an interaction between the two elements. For a person of ordinary skill in the art, the specific meaning of the above terminology in the present invention can be understood on a case-by-case basis.

In the present invention, it should be noted that unless clear rules and limitations otherwise exist, words "a first feature is "on" or "under" a second feature" can include a direct contact of the first and second features, can also include a contact of the first and second features through another feature therebetween instead of a direct contact. Furthermore, words "the first feature is "above" or "over" the second feature include that the first feature is right above or obliquely above the second feature, or only indicate that a level of the first feature is higher that of the second feature. Words "the first feature is "under" or "below" the second feature include that the first feature is right under or obliquely under the second feature, or only indicate that the level of the first feature is lower than that of the second feature.

The following disclosure provides many different embodiments or examples to achieve different structures of the present invention. To simplify the disclosure of the present invention, the components and arrangements of the specific examples are described below. Of course, they are merely examples, and the purpose is not to limit the present invention. Furthermore, the present invention may repeat reference numerals and/or reference letters in different examples. The repetition is for the purpose of simplification and clarity, and does not by itself indicate the relationship between the various embodiments and/or settings discussed. In addition, the present invention provides examples of various specific processes and materials, but a person of ordinary skill in the art can be aware of the application of other processes and/or the use of other materials.

The embodiment of the present invention provides a display panel and a display device which will be described respectively as below.

The display panel provided by the present invention can comprise: a bending region; a first non-bending region; a second non-bending region. The second non-bending region is disposed opposite to the first non-bending region. The second non-bending region is connected to the first non-bending region through the bending region. A first support structure is disposed between the first non-bending region and the second non-bending region, a step structure is formed on a side of the first support structure near the bending region, and the step structure is configured to support the bending region.

The display panel provided by the embodiment of the present invention, comprises a first non-bending region and a second non-bending region disposed opposite to each other, a support structure disposed between the first non-bending region and the second non-bending region, and a bending region connected to the first non-bending region and the second non-bending region. A step structure is formed on a side of the support structure near the bending region such that when the bending region is squeezed by an external force, the step structure on the support structure can disperse stress, and the bending region would not deform extremely easily, which prevents broken wires and improve a production rate.

With reference to FIG. 1, FIG. 1 is a schematic structural view of an embodiment of a display panel provided by the present invention. A first non-bending region 11 and a second non-bending region 12 are disposed opposite to each other. The first non-bending region 11 is connected to the second non-bending region 12 through a bending region 13 formed by curing a photosensitive adhesive. The first support structure 14 is disposed between the first non-bending region 11 and the second non-bending region 12, and a step structure is formed on a side of the first support structure 14 near the bending region. The step structure can support the bending region.

In an embodiment of the present invention, the first support structure 14 is disposed between the first non-bending region 11 and the second non-bending region 12. The first support structure 14 can support the first non-bending region 11 and the second non-bending region 12. A step structure 15 is formed on a side of the first support structure 14 near the bending region 13 such that when an external force is exerted on the bending region, the bending region 14 deforms and contacts the step structure 15, the step structure 15 can support the bending region to prevent excessive deformation of the bending region.

With reference to FIG. 1, In an embodiment of the present invention, the first support structure 14 is disposed between the first bending region 11 and the second bending region 13. As shown in the step structure 15 in FIG. 1, a step structure 15 is formed on the first support structure 14, and the step structure 15 is formed on a side of the first support structure 14 near the bending region 13 such that the step structure 15 can support the bending region 13 to prevent deformation of the bending region.

With reference to FIG. 1, in some embodiments of the present invention, the first support structure 14 can comprise a first support layer 141, a second support layer 142, and a third support layer 143. The first support layer 141 is directly connected to the first non-bending region 11, the first support layer 141 supports the first non-bending region 11. The second support layer 142 is disposed under the first support layer 141. The third support layer 143 is disposed under the second support layer 142, and the second support layer 142 supports the second non-bending region 12.

In the above embodiment, the first non-bending region 11 and the second non-bending region 12 are respectively formed on the first support layer 141 and the third support layer 143 first, then the bending region is used to connect the first non-bending region 11 to the second non-bending region 12. In the meantime, a gap exists between the first support layer 141 and the third support layer 143 such that a second support layer 142 can be disposed between the first support layer 141 and the third support layer 143. The first support layer 141 is connected to the third support layer 143 through the second support layer 142 to prevent collapse of the first support layer 141 and the third support layer 143 due to the gap therebetween.

Figure 2:
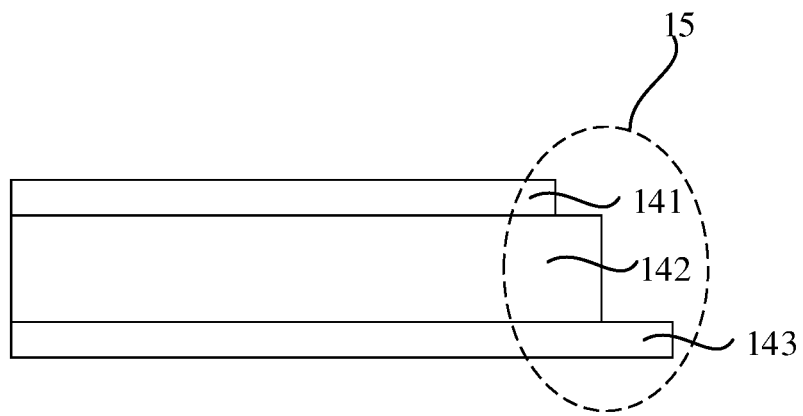
FIG. 2 is a schematic enlarged view of an embodiment of a step structure provided by the embodiment of the present invention.

With reference to FIG. 2, FIG. 2 is a schematic enlarged view of an embodiment of a step structure provided by the embodiment of the present invention. In FIG. 2, the step structure 15 extends along an extension direction of the first non-bending region 11.

Specifically, with reference to FIG. 2, the first support structure 14 can comprise layer a first support layer 141, a second support layer 142, and a third support layer 143 that are laminated together. A length of a side of the second support layer 142 near the bending region 13 exceeds the first support layer 141. A length of a side of the third support layer 143 near the bending region 13 exceeds the second support layer 142. In other words, the first support layer 141, the second support layer 142, and the third support layer 143 form the step structure from top to bottom sequentially.

In some embodiments of the present invention, the length of the second support layer 142 exceeding the first support layer 141 can be equal to the length of the third support layer 143 exceeding the second support layer 142. In other words, in the step structure 15 step lengths of adjacent layers are equal.

With reference to FIG. 2, because the step structure 15 is formed on the side of the first support structure 14 near the bending region 13, when an external force is applied to the bending region 13, the bending region 13 deforms and contacts the step structure 15 on the first support structure 14. Because of existence of the step structure and a usually curved shape of the bending region 13, a side of the bending region 13 away from display panel contacts the step structure after slightly deforming, the step structure supports the bending region to increase stress of the display panel bending region.

Figure 3:
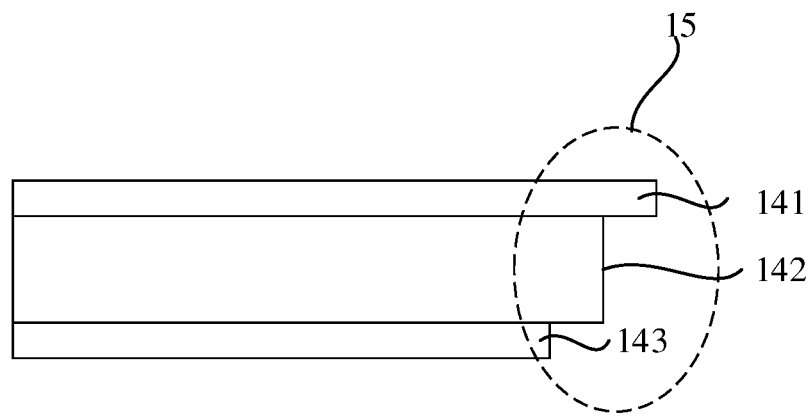
FIG. 3 is a schematic enlarged view of another embodiment of a step structure provided by the embodiment of the present invention.

With reference to FIG. 3, FIG. 3 is a schematic enlarged view of another embodiment of a step structure provided by the embodiment of the present invention. The first support structure 14 can further comprise a first support layer 141, a second support layer 142, and a third support layer 143 that are laminated together. The first support layer 141 is disposed under the first non-bending region 11 to support the first non-bending region 11. The third support layer 143 is disposed above the second non-bending region 12 to support the second non-bending region 12. The second support layer 142 is disposed between the first support layer 141 and the second support layer 142.

A step structure is also formed among the first support layer 141, the second support layer 142, and the third support layer 143. However, in the step structure shown in FIG. 3, the first support layer 141 exceeds the second support layer 142 in a direction near the bending region 13, the second support layer 142 exceeds the third support layer 143 in a direction near the bending region 13. Namely, the step structure in FIG. 3 is disposed from bottom to top.

Functioning the same as the step structure 15 in FIG. 2, because existence of the step structure 15, after the bending region 13 suffers the external force, compared to the display panel without a step structure 15, the bending region 13 contacts the step structure 15 with less deformation to improve stress bearability of the bending region.

In an embodiment of the present invention, a step range of the step structure 15 along an extension direction of the first non-bending region 11 can be 0.1 mm-0.3 mm. Namely, a range of a width of each layer structure in the step structure 15 exceeding other layer connected thereto along the extension direction of the first non-bending region can be 0.1 mm-0.3 mm. Taking the step structure in FIG. 2 as an example, a range of a width of the second support layer 142 exceeding the first support layer 141 along the extension direction of the first non-bending region 11, i.e., a direction near the bending region 13 can be 0.1 mm-0.3 mm. A range of a width of the third support layer 143 exceeding the second support layer 142 along a direction of the first non-bending region 11, i.e., a direction near the bending region 13 can be 0.1 mm-0.3 mm.

Specifically, a step of the step structure 15 along the extension direction of the first non-bending region, i.e., the direction near the bending region 13 can be 0.01 mm, 0.2 mm, or 0.3 mm.

In an embodiment of the present invention, material of the first support layer 141 can be the same as material of the third support layer 143, and manufacturing methods can be the same to simultaneously manufacture the first support layer 141 and the second support layer 143 to reduce manufacturing processes. Specifically, material of the first support layer 141 and third support layer 143 can be the same, can be plastic or polyimide film.

Figure 4:
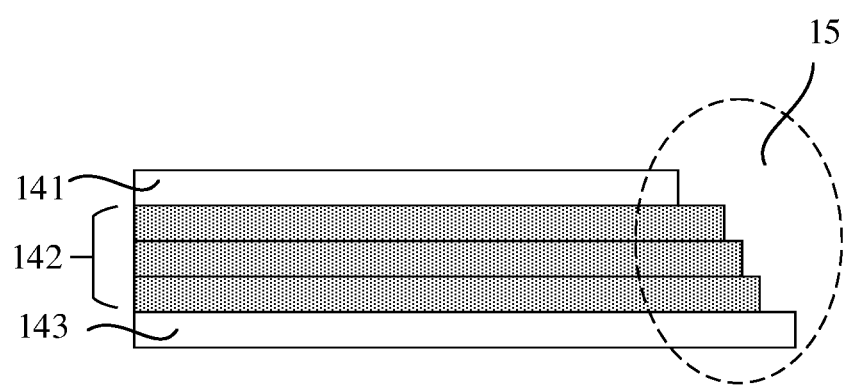
FIG. 4 is a schematic structural view of an embodiment of a second support layer provided by the embodiment of the present invention.

In another some embodiments of the present invention, the second support layer 142 can be a multi-layer structure that is laminated. With reference to FIG. 4, FIG. 4 is a schematic structural view of an embodiment of a second support layer provided by the embodiment of the present invention. In FIG. 4, the second support layer 142 is a multi-layer structure that is laminated, and a step structure is also formed on a side of the multi-layer structure forming the second support layer 142 near the bending region 13, which further increases supporting stress of the second support layer 142.

In the embodiment as shown in FIG. 4, the second support layer 142 can comprise a triple layer structure that is laminated. With reference to FIGS. 2 and 4, in FIG. 2 the first support layer 141, the second support layer 142, and the third support layer 143 form a top-to-bottom step structure 15. The step structure on the second support layer 142 in FIG. 4 can be disposed correspondingly to the step structure in FIG. 2. Namely, the step structure formed from the second support layer in FIG. 4 is also a top-to-bottom step structure.

In the above embodiment, second support layer 142 can be a triple-layer structure that is laminated, a step structure is formed on a side of the triple-layer structure near the bending region 13. In an embodiment of the present invention, material of the triple-layer structure of the second support layer 142 can be the same such that when the second support layer 142 is manufactured, the same processing devices can be employed for processes to reduce processes.

In another some embodiments of the present invention, when the second support layer 142 is a multi-layer structure, material of the multi-layer structure forming the second support layer 142 can be different such that hardnesses in the multi-layer structure are also different. Such configuration can better support the display panel.

In an embodiment of the present invention, when the second support layer 142 is a triple-layer structure, hardnesses of materials of the triple-layer structure can sequentially increase or decrease.

In a specific embodiment of the present invention, when the second support layer 142 is a triple-layer structure, materials of the triple-layer structure can be sequentially foam, stainless steel material, and stiffener. The stiffener has the greatest hardness and can effectively support the first non-bending region 11 and the second non-bending region 12. In the meantime, when the bending region 13 suffers an external force and deforms, the deformed bending region 13 can also be effectively supported.

In other embodiment of the present invention, the second support layer can also be made by materials with different hardnesses, which is not limited herein.

In the above embodiment, when the second support layer 142 is a triple-layer structure and a step structure is also formed on a side of the second support layer 142 near the bending region 13, a range of a width of a side of the step structure along an extension direction of the first non-bending region 11 near the bending region 13 can also be 0.1 mm-0.3 mm.

In a specific embodiment of the present invention, when the second support layer 142 is a triple-layer structure, a length of a side of a layer structure of the second support layer 142 directly connected to the first support layer 141 along an extension direction of the first non-bending region 11 near the bending region 13 exceeding the first support layer can be 0.15 mm.

The step structure of the second support layer 142 can be a top-to-bottom step structure, and a width of a side of each layer structure along an extension direction of the first non-bending region 11 near the bending region 13 exceeding an above layer structure connected thereto can also be 0.15 mm.

A width of a side of the third support layer 143 along an extension direction of the first non-bending region 11 near the bending region 13 exceeding a layer structure of the third support layer 143 directly connected to the second support layer 142 can also be 0.15 mm.

In the above embodiment, a range of a width of each layer structure in the step structure exceeding other adjacent structure can be 0.1 mm-0.3 mm, can be specifically set according to an actual size of the display panel, and is not limited herein.

In another some embodiments of the present invention, when a step structure is also formed on the second support layer 142, a side of the third support layer along the extension direction of the first non-bending region 11 near the bending region 13 can also not exceed the second support layer 142. On the contrary, the second support layer 142 can exceed the third support layer 143. Because the step structure has been formed between the first support layer 141 and the second support layer 142 and the step structure is also formed on the second support layer 142, there is no limitation whether the third support layer 143 exceeds the second support layer.

Figure 5:
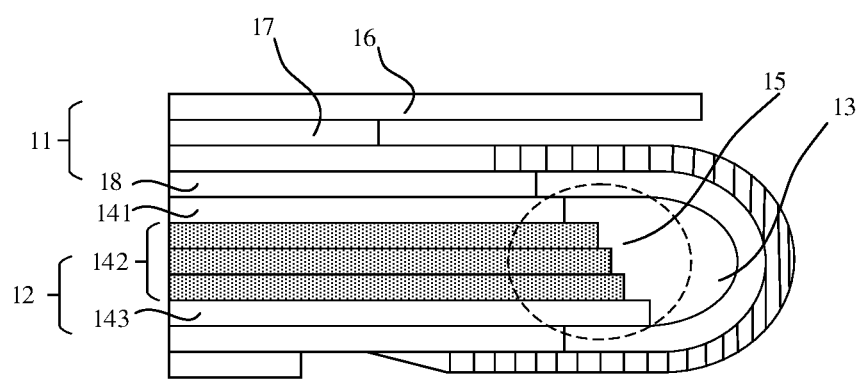
FIG. 5 is a schematic structural view of another embodiment of the display panel provided by the embodiment of the present invention.

In some embodiments of the present invention, the display panel can further comprise a cage cover glass (cover window, CW), a polarizer, etc. With reference to FIG. 5, FIG. 5 is a schematic structural view of another embodiment of the display panel provided by the embodiment of the present invention. The display panel can comprise: a first non-bending region 11 and a second non-bending region 12 that are disposed opposite to each other. The first non-bending region 11 is connected to the second non-bending region 12 through bending region 13. The bending region 13 can be formed by curing a photosensitive adhesive (UV adhesive).

In the meantime, in the display panel as shown in FIG. 5, a first support structure 14 is further disposed between the first non-bending region 11 and the second non-bending region 12 to support the first non-bending region 11 and the second non-bending region 12. The first support structure 14 can comprise a first support layer 141, a second support layer 142, and a third support layer 143 that are laminated together. The first support layer 141 is directly connected to the first non-bending region 11. The third support layer 143 is directly connected to the second non-bending region 12. In an embodiment of the present invention, when the display panel is manufactured, the first support layer 141 and the third support layer 143 can be manufactured first. The same manufacturing processes can be used to manufacture the first support layer 141 and the third support layer 143 simultaneously to reduce manufacturing processes. Then, a first displaying region and a second displaying region are manufactured on the first support layer 141 and the third support layer 143 respectively. The first displaying region is located in the first non-bending region 11, and the second displaying region is located in the second non-bending region 12.

In FIG. 5, material of the first support layer 141 can be equal to material of the third support layer 143. The second support layer 142 located between the first support layer 141 and the third support layer 143 can be a multi-layer structure. Specifically, the second support layer 142 can comprise a triple-layer structure that is laminated. Materials forming the triple-layer structure of second support layer 142 can be different, i.e., hardnesses of layers of the triple-layer structure of the second support layer 143 are different.

In the meantime, in the display panel as shown in FIG. 5, a top-to-bottom step structure 15 is formed on sides of the first support layer 141, the second support layer 142, and the third support layer 143 near the bending region 13. In other words, the side of the first support layer 141 near the bending region 13 exceeds the second support layer 142, and the side of the second support layer 142 near the bending region 13 exceeds the third support layer 143.

In the above embodiment, the second support layer 142 is a multi-layer structure, and sides of layers of the multi-layer structure forming the second support layer 142 near the bending region 13 also form a step structure. a direction of the step structure on the second support layer 142 is the same as directions of the first support layer 141, the second support layer 142, and the third support layer 143 on which the step structure is formed along, which are all top-to-bottom step structures. The step structures formed by such manner makes the first support structure 14 better supporting the bending region 13.

In the display panel as shown in FIG. 5, the display panel can further comprise a cage cover glass 16, and the cage cover glass 16 covers an upper surface of the display panel through an optical adhesive 17 to protect internal structures of the display pane. A polarizer 18 is further formed above the displaying region of the display panel, and the polarizer 18 is directly connected to the optical adhesive 17 and the displaying region.

The present invention also provides a display device, the display device comprises the display panel as above, the display panel can comprise: a bending region; a first non-bending region; a second non-bending region. The second non-bending region is disposed opposite to the first non-bending region. The second non-bending region is connected to the first non-bending region through the bending region. A first support structure is disposed between the first non-bending region and the second non-bending region, a step structure is formed on a side of the first support structure near the bending region, and the step structure is configured to support the bending region.

The display panel provided by the embodiment of the present invention, comprises a first non-bending region and a second non-bending region disposed opposite to each other, a support structure disposed between the first non-bending region and the second non-bending region, and a bending region connected to the first non-bending region and the second non-bending region. A step structure is formed on a side of the support structure near the bending region such that when the bending region is squeezed by an external force, the step structure on the support structure can disperse stress, and the bending region would not deform extremely easily, which prevents broken wires and improve a production rate.

With reference to FIG. 1, FIG. 1 is a schematic structural view of an embodiment of a display panel provided by the present invention. A first non-bending region 11 and a second non-bending region 12 are disposed opposite to each other. The first non-bending region 11 is connected to the second non-bending region 12 through a bending region 13 formed by curing a photosensitive adhesive. The first support structure 14 is disposed between the first non-bending region 11 and the second non-bending region 12, and a step structure is formed on a side of the first support structure 14 near the bending region. The step structure can support the bending region.

In an embodiment of the present invention, the first support structure 14 is disposed between the first non-bending region 11 and the second non-bending region 12. The first support structure 14 can support the first non-bending region 11 and the second non-bending region 12. A step structure 15 is formed on a side of the first support structure 14 near the bending region 13 such that when an external force is exerted on the bending region, the bending region 14 deforms and contacts the step structure 15, the step structure 15 can support the bending region to prevent excessive deformation of the bending region.

With reference to FIG. 1, in some embodiments of the present invention, the first support structure 14 can comprise a first support layer 141, a second support layer 142, and a third support layer 143. The first support layer 141 is directly connected to the first non-bending region 11, the first support layer 141 supports the first non-bending region 11. The second support layer 142 is disposed under the first support layer 141. The third support layer 143 is disposed under the second support layer 142, and the second support layer 142 supports the second non-bending region 12.

In the above embodiment, the first non-bending region 11 and the second non-bending region 12 are respectively formed on the first support layer 141 and the third support layer 143 first, then the bending region is used to connect the first non-bending region 11 to the second non-bending region 12. In the meantime, a gap exists between the first support layer 141 and the third support layer 143 such that a second support layer 142 can be disposed between the first support layer 141 and the third support layer 143. The first support layer 141 is connected to the third support layer 143 through the second support layer 142 to prevent collapse of the first support layer 141 and the third support layer 143 due to the gap therebetween.

With reference to FIG. 2, FIG. 2 is a schematic enlarged view of an embodiment of a step structure provided by the embodiment of the present invention. In FIG. 2, the step structure 15 extends along an extension direction of the first non-bending region 11.

Specifically, with reference to FIG. 2, the first support structure 14 can comprise layer a first support layer 141, a second support layer 142, and a third support layer 143 that are laminated together. A length of a side of the second support layer 142 near the bending region 13 exceeds the first support layer 141. A length of a side of the third support layer 143 near the bending region 13 exceeds the second support layer 142. In other words, the first support layer 141, the second support layer 142, and the third support layer 143 form the step structure from top to bottom sequentially.

With reference to FIG. 2, because the step structure 15 is formed on the side of the first support structure 14 near the bending region 13, when an external force is applied to the bending region 13, the bending region 13 deforms and contacts the step structure 15 on the first support structure 14. Because of existence of the step structure and a usually curved shape of the bending region 13, a side of the bending region 13 away from display panel contacts the step structure after slightly deforming, the step structure supports the bending region to increase stress of the display panel bending region.

With reference to FIG. 3, FIG. 3 is a schematic enlarged view of another embodiment of a step structure provided by the embodiment of the present invention. The first support structure 14 can further comprise a first support layer 141, a second support layer 142, and a third support layer 143 that are laminated together. The first support layer 141 is disposed under the first non-bending region 11 to support the first non-bending region 11. The third support layer 143 is disposed above the second non-bending region 12 to support the second non-bending region 12. The second support layer 142 is disposed between the first support layer 141 and the second support layer 142.

A step structure is also formed among the first support layer 141, the second support layer 142, and the third support layer 143. However, in the step structure shown in FIG. 3, the first support layer 141 exceeds the second support layer 142 in a direction near the bending region 13, the second support layer 142 exceeds the third support layer 143 in a direction near the bending region 13. Namely, the step structure in FIG. 3 is disposed from bottom to top.

Functioning the same as the step structure 15 in FIG. 2, because existence of the step structure 15, after the bending region 13 suffers the external force, compared to the display panel without a step structure 15, the bending region 13 contacts the step structure 15 with less deformation to improve stress bearability of the bending region.

In an embodiment of the present invention, a step range of the step structure 15 along an extension direction of the first non-bending region 11 can be 0.1 mm-0.3 mm. Namely, a range of a width of each layer structure in the step structure 15 exceeding other layer connected thereto along the extension direction of the first non-bending region can be 0.1 mm-0.3 mm. Taking the step structure in FIG. 2 as an example, a range of a width of the second support layer 142 exceeding the first support layer 141 along the extension direction of the first non-bending region 11, i.e., a direction near the bending region 13 can be 0.1 mm-0.3 mm. A range of a width of the third support layer 143 exceeding the second support layer 142 along a direction of the first non-bending region 11, i.e., a direction near the bending region 13 can be 0.1 mm-0.3 mm.

Specifically, a step of the step structure 15 along the extension direction of the first non-bending region, i.e., the direction near the bending region 13 can be 0.01 mm, 0.2 mm, or 0.3 mm.

In an embodiment of the present invention, material of the first support layer 141 can be the same as material of the third support layer 143, and manufacturing methods can be the same to simultaneously manufacture the first support layer 141 and the second support layer 143 to reduce manufacturing processes. Specifically, material of the first support layer 141 and third support layer 143 can be the same, can be plastic or polyimide film.

In another some embodiments of the present invention, the second support layer 142 can be a multi-layer structure that is laminated. With reference to FIG. 4, FIG. 4 is a schematic structural view of an embodiment of a second support layer provided by the embodiment of the present invention. In FIG. 4, the second support layer 142 is a multi-layer structure that is laminated, and a step structure is also formed on a side of the multi-layer structure forming the second support layer 142 near the bending region 13, which further increases supporting stress of the second support layer 142.

In the embodiment as shown in FIG. 4, the second support layer 142 can comprise a triple layer structure that is laminated. With reference to FIGS. 2 and 4, in FIG. 2 the first support layer 141, the second support layer 142, and the third support layer 143 form a top-to-bottom step structure 15. The step structure on the second support layer 142 in FIG. 4 can be disposed correspondingly to the step structure in FIG. 2. Namely, the step structure formed from the second support layer in FIG. 4 is also a top-to-bottom step structure.

In the above embodiment, second support layer 142 can be a triple-layer structure that is laminated, a step structure is formed on a side of the triple-layer structure near the bending region 13. In an embodiment of the present invention, material of the triple-layer structure of the second support layer 142 can be the same such that when the second support layer 142 is manufactured, the same processing devices can be employed for processes to reduce processes.

In another some embodiments of the present invention, when the second support layer 142 is a multi-layer structure, material of the multi-layer structure forming the second support layer 142 can be different such that hardnesses in the multi-layer structure are also different. Such configuration can better support the display panel.

In an embodiment of the present invention, when the second support layer 142 is a triple-layer structure, hardnesses of materials of the triple-layer structure can sequentially increase or decrease.

In a specific embodiment of the present invention, when the second support layer 142 is a triple-layer structure, materials of the triple-layer structure can be sequentially foam, stainless steel material, and stiffener. The stiffener has the greatest hardness and can effectively support the first non-bending region 11 and the second non-bending region 12. In the meantime, when the bending region 13 suffers an external force and deforms, the deformed bending region 13 can also be effectively supported.

In the above embodiment, when the second support layer 142 is a triple-layer structure and a step structure is also formed on a side of the second support layer 142 near the bending region 13, a range of a width of a side of the step structure along an extension direction of the first non-bending region 11 near the bending region 13 can also be 0.1 mm-0.3 mm.

In a specific embodiment of the present invention, when the second support layer 142 is a triple-layer structure, a length of a side of a layer structure of the second support layer 142 directly connected to the first support layer 141 along an extension direction of the first non-bending region 11 near the bending region 13 exceeding the first support layer can be 0.15 mm.

The step structure of the second support layer 142 can be a top-to-bottom step structure, and a width of a side of each layer structure along an extension direction of the first non-bending region 11 near the bending region 13 exceeding an above layer structure connected thereto can also be 0.15 mm.

A width of a side of the third support layer 143 along an extension direction of the first non-bending region 11 near the bending region 13 exceeding a layer structure of the third support layer 143 directly connected to the second support layer 142 can also be 0.15 mm.

In the above embodiment, a range of a width of each layer structure in the step structure exceeding other adjacent structure can be 0.1 mm-0.3 mm, can be specifically set according to an actual size of the display panel, and is not limited herein.

In another some embodiments of the present invention, when a step structure is also formed on the second support layer 142, a side of the third support layer along the extension direction of the first non-bending region 11 near the bending region 13 can also not exceed the second support layer 142. On the contrary, the second support layer 142 can exceed the third support layer 143. Because the step structure has been formed between the first support layer 141 and the second support layer 142 and the step structure is also formed on the second support layer 142, there is no limitation whether the third support layer 143 exceeds the second support layer.

In some embodiments of the present invention, the display panel can further comprise a cage cover glass (cover window, CW), a polarizer, etc. With reference to FIG. 5, FIG. 5 is a schematic structural view of another embodiment of the display panel provided by the embodiment of the present invention. The display panel can comprise: a first non-bending region 11 and a second non-bending region 12 that are disposed opposite to each other. The first non-bending region 11 is connected to the second non-bending region 12 through bending region 13. The bending region 13 can be formed by curing a photosensitive adhesive (UV adhesive).

In the meantime, in the display panel as shown in FIG. 5, a first support structure 14 is further disposed between the first non-bending region 11 and the second non-bending region 12 to support the first non-bending region 11 and the second non-bending region 12. The first support structure 14 can comprise a first support layer 141, a second support layer 142, and a third support layer 143 that are laminated together. The first support layer 141 is directly connected to the first non-bending region 11. The third support layer 143 is directly connected to the second non-bending region 12. In an embodiment of the present invention, when the display panel is manufactured, the first support layer 141 and the third support layer 143 can be manufactured first. The same manufacturing processes can be used to manufacture the first support layer 141 and the third support layer 143 simultaneously to reduce manufacturing processes. Then, a first displaying region and a second displaying region are manufactured on the first support layer 141 and the third support layer 143 respectively. The first displaying region is located in the first non-bending region 11, and the second displaying region is located in the second non-bending region 12.

In FIG. 5, material of the first support layer 141 can be equal to material of the third support layer 143. The second support layer 142 located between the first support layer 141 and the third support layer 143 can be a multi-layer structure. Specifically, the second support layer 142 can comprise a triple-layer structure that is laminated. Materials forming the triple-layer structure of second support layer 142 can be different, i.e., hardnesses of layers of the triple-layer structure of the second support layer 143 are different.

In the meantime, in the display panel as shown in FIG. 5, a top-to-bottom step structure 15 is formed on sides of the first support layer 141, the second support layer 142, and the third support layer 143 near the bending region 13. In other words, the side of the first support layer 141 near the bending region 13 exceeds the second support layer 142, and the side of the second support layer 142 near the bending region 13 exceeds the third support layer 143.

In the above embodiment, the second support layer 142 is a multi-layer structure, and sides of layers of the multi-layer structure forming the second support layer 142 near the bending region 13 also form a step structure. a direction of the step structure on the second support layer 142 is the same as directions of the first support layer 141, the second support layer 142, and the third support layer 143 on which the step structure is formed along, which are all top-to-bottom step structures. The step structures formed by such manner makes the first support structure 14 better supporting the bending region 13.

In the display panel as shown in FIG. 5, the display panel can further comprise a cage cover glass 16, and the cage cover glass 16 covers an upper surface of the display panel through an optical adhesive 17 to protect internal structures of the display panel. A polarizer 18 is further formed above the displaying region of the display panel, and the polarizer 18 is directly connected to the optical adhesive 17 and the displaying region.

In the above-mentioned embodiments, the descriptions of the various embodiments are focused. For the details of the embodiments not described, reference may be made to the related descriptions of the other embodiments.

The display panel and the display device provided by the embodiment of the present invention are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not depart from the essence of the technical solutions of the embodiments of the present application.

What is claimed is:

1. A display panel, comprising:
   a bending region;
   a first non-bending region;
   a second non-bending region, the second non-bending region disposed opposite to the first non-bending region, and the second non-bending region connected to the first non-bending region through the bending region; and
   a first support structure, the first support structure disposed between the first non-bending region and the second non-bending region, a step structure formed on a side of the first support structure near the bending region, and the step structure configured to support the bending region;
   wherein the step structure comprises at least three step units arranged sequentially along a direction from the first non-bending region to the second non-bending region, or from the second non-bending region to the first non-bending region.

2. The display panel according to claim 1, wherein a step range of the step structure along an extension direction of the first non-bending region is 0.1 mm-0.3 mm.

3. The display panel according to claim 1, wherein the first support structure comprises:
   a first support layer, the first support layer directly connected to the first non-bending region, and the first support layer supporting the first non-bending region;
   a second support layer, the second support layer disposed under the first support layer; and
   a third support layer, the third support layer disposed under the second support layer and located above the second non-bending region, and the third support layer supporting the second non-bending region;

wherein the at least three step units are formed by the first support layer, the second support layer, and the third support layer.

4. The display panel according to claim 3, wherein a side of the second support layer near the bending region exceeds the first support layer; a side of the third support layer near the bending region exceeds the second support layer.

5. The display panel according to claim 4, wherein a length of the second support layer exceeding the first support layer is equal to a length of the third support layer exceeding the second support layer.

6. The display panel according to claim 3, wherein the second support layer is a multi-layer structure that is laminated, and a step structure is formed on a side of the multi-layer structure forming the second support layer near the bending region.

7. The display panel according to claim 6, wherein material of each layer of the multi-layer structure is different.

8. The display panel according to claim 3, wherein material of the first support layer and material of the third support layer are the same.

9. The display panel according to claim 1, wherein a photosensitive adhesive after curing is connected to the first non-bending region and the second non-bending region, and the photosensitive adhesive after curing is bent to form the bending region.

10. A display device, comprising the display panel according to claim 1, wherein the display panel comprises:
    a bending region;
    a first non-bending region;
    a second non-bending region, the second non-bending region disposed opposite to the first non-bending region, and the second non-bending region connected to the first non-bending region through the bending region; and
    a first support structure, the first support structure disposed between the first non-bending region and the second non-bending region, a step structure formed on a side of the first support structure near the bending region, and the step structure configured to support the bending region;
    wherein the step structure comprises at least three step units arranged sequentially along a direction from the first non-bending region to the second non-bending region, or from the second non-bending region to the first non-bending region.

11. The display device according to claim 10, wherein a step range of the step structure along an extension direction of the first non-bending region is 0.1 mm-0.3 mm.

12. The display panel according to claim 10, wherein the first support structure comprises:
    a first support layer, the first support layer directly connected to the first non-bending region, and the first support layer supporting the first non-bending region;
    a second support layer, the second support layer disposed under the first support layer; and
    a third support layer, the third support layer disposed under the second support layer and located above the second non-bending region, and the third support layer supporting the second non-bending region;
    wherein the at least three step units are formed by the first support layer, the second support layer, and the third support layer.

13. The display panel according to claim 12, wherein a side of the second support layer near the bending region exceeds the first support layer; a side of the third support layer near the bending region exceeds the second support layer.

14. The display panel according to claim 13, wherein a length of the second support layer exceeding the first support layer is equal to a length of the third support layer exceeding the second support layer.

15. The display panel according to claim 12, wherein the second support layer is a multi-layer structure that is laminated, and a step structure is formed on a side of the multi-layer structure forming the second support layer near the bending region.

16. The display panel according to claim 15, wherein material of each layer of the multi-layer structure is different.

17. The display panel according to claim 12, wherein material of the first support layer and material of the third support layer are the same.

18. The display device according to claim 10, wherein a photosensitive adhesive after curing is connected to the first non-bending region and the second non-bending region, and the photosensitive adhesive after curing is bent to form the bending region.

* * * * *